2,781,327
PHENOLIC RESIN GLUE COMPOSITIONS CONTAINING MODIFIED BARK PHLOEM FLOUR

Joseph W. Ayers, Easton, Pa., and John J. Bradley, Jr., Winchester, Mass., assignors to Agrashell, Inc., Los Angeles, Calif., a corporation of Delaware No Drawing. Application May 6, 1953,
Serial No. 353,422

7 Claims. (Cl. 260—17.2)

This invention relates to phenolic resin glue compositions containing extender-bodying agents which may be described as a chemically modified vegetable material in finely divided form comprising principally the non-fibrous component of bark phloem, such as may be obtained from pine, hemlock, fir, cedar and other like trees.

The bark phloem product in its natural state does not possess properties rendering the same of any practical value in adhesive compositions. In view of the availability of bark as a waste product, efforts have heretofore been made to render bark products useful for such purpose and one such attempt has involved modification of the bark phloem by a treatment with sodium hydroxide at a high temperature. Although the product thus obtained can be used in glue compositions, difficulties are encountered in obtaining uniform or stable adhesive compositions and the plywood produced therefrom is lacking in desirable qualities. The presence of water soluble components in the extender produces instability against moisture in the bond, and the plywood is suitable only for interior use.

An object of the present invention is to produce phenolic glue compositions and plywood bonded by means of the same containing an extender-bodying agent derived from bark phloem which does not impart the objectional qualities introduced by known modified bark phloem extenders. Stated more directly, the object is to produce glue compositions which are uniform and stable in viscosity at highly desirable centipoise levels and which produce plywoods of greater weather and moisture resistance suitable, in certain formulations, for exterior use.

These and other objects of the invention are achieved by incorporating in alkaline adhesive solutions a substantial quantity of an extender-bodying agent produced by the reaction of bark phloem particles or flour with an alkali metal hydroxide and with a difficultly soluble alkaline hydroxide. Through this dual alkaline treatment the particles are wholly or in part modified in their chemical content and in their physical properties, and the resulting mass contains various unidentified derivatives apparently including metal-organic complexes or lignates of the polyvalent metals of the hydroxides reacted, the said derivatives being all or at least in substantial part in an insoluble state.

The bark materials contemplated by the invention is typified by the following analysis and properties of a commercial flour.

Content: Percent
    Cellulose, by weight_____ 29
    Lignin, by weight_____ 59
Properties:
    Sol. in cold water, 24 hrs_____ 7.54
    Sol. in hot water, 2 hrs_____ 11.98
    Sol. in 1% NaOH, 1 hr_____ 56.70
    Sol. in 10% $H_2SO_4$, 1 hr_____ 17.85
Particle size distribution:
    On 100 mesh_____ 6
    100–200 mesh _____ 45
    200–325 mesh _____ 24
    Through 325 mesh_____ 25

The "alkali metal" hydroxide used in the production of the new extender, as defined herein is intended to include ammonium hydroxide as well as the hydroxides of the true alkali metals, as sodium and potassium. The difficultly soluble alkaline hydroxide may be the hydroxide of any one or combination of a large number of metals. There may be mentioned, for example, the hydroxides of calcium, barium, magnesium, zinc, copper, lead, iron, cobalt, nickel, aluminum and manganese. These hydroxides have the common function of providing insoluble reaction products in the reaction mass. They may be thought of as insolubilizing reagents, for their absence the alkali metal hydroxide would produce only soluble derivatives in the reaction mass.

Although these difficultly soluble alkaline compounds are at least theoretically in the form of hydroxides at the time they are reacted, they need not be introduced into the reaction mixture in such form. These reagents can be introduced in the form of their oxides, as for example, lime, and the oxides of barium, zinc, copper and magnesium. The oxide and hydroxides may be referred to collectively as "difficultly soluble hydroxide-providing oxidic compounds."

The amount of the mixture of the two alkaline compounds which can be employed in producing the modified extender varies within wide limits. Although any appreciable amount may produce beneficial results, at least 4% in relation to the amount of the vegetable bark flour treated is ordinarily required. The amount of the reagents employed in any particular instance depends upon several factors including the nature of the raw material treated and the use to which the final product is to be put. Since the amount of lignin in the initial materials differs somewhat, the amount of the reagents which can be reacted varies. No absolute limits can be set forth.

Furthermore, the reaction can be carried out in such manner as to effect complete reaction with substantially all of the lignin present or alternatively the conditions can be regulated such that only a superficial reaction on the particles will be obtained. Finally, the reaction may be carried out in such manner that only a part of the bark flour ultimately to be used will be reacted to any substantial extent with the alkaline reagents. In this latter case the reaction may be carried out initially with all or a part of the soluble alkali and a part of the second alkaline reagent and the reaction may be continued to a more or less extent in the presence of a second addition of bark flour and/or reagent. Under one of the procedures it will be seen that unaltered particles will be present in admixture with the modified particles.

The relative proportions as between the two alkaline reagents which can be employed in the operation of the invention, will vary in relation to the desired quality of the bond to be produced in the plywood or glued products formed. It is preferred that the reagents be used in substantially stoichiometric proportions. Under this procedure, the products produced would contain little or no water-soluble derivatives. If the amount of alkali metal hydroxide used is in excess of the equivalent amount, then soluble components may remain in the mass and lead to final coatings and coverings of inadequate weather-resistance. Any excess of soluble components can be removed from the reaction product if desired, as by diluting with water and decanting. A small proportion of these soluble components, however, may serve a desirable function in some aqueous media in which the products can be employed.

If the amount of difficultly soluble alkaline compound used exceeds that of the alkali metal hydroxide, then the final product may contain a quantity of insoluble alkali corresponding more or less to the amount of the excess. In some compositions and glued products the presence of a small amount of lime or other insoluble material may have no ill effect, but the proportion used must be below that which will cause the resin to precipitate or coagulate. The presence of too large an excess will also cause the bonding strength of the glue to decrease.

The reaction of the bark flour with the alkaline reagents may be carried out at any temperature, as from room temperature to boiling. Ordinarily heat in moderate amounts is desirable to speed up the rate of reaction. The reaction may be carried out without applying heat to the reaction mixture, for ordinarily, adequately elevated temperatures for quick reaction are obtained by utilizing only autogenous heat or the heat of dissolution of the alkali metal hydroxide and the heat of wetting developed when water is mixed with the finely divided organic material. By the utilization of these sources of heat the reaction mass can be increased in temperature by from about 35 to 60 or possibly 70° F. above normal atmospheric temperature dependent on the procedure employed and the quantity of the composition processed in relation to the amount of alkali and water present.

With the temperature increase developed by the reagents, the reaction will proceed adequately in a period of from about 25 to 30 minutes. At higher temperatures the period may be shorter and at lower temperatures the time required is increased.

In an alternative procedure, part of the finely divided bark material is mixed with the alkali metal hydroxide and heated to a higher temperature, as from 160° F. to boiling, after which the reaction mass is permitted to cool somewhat whereupon the difficultly soluble alkaline oxidic compound together with the remainder of the organic material is added. In this reaction the soluble hydroxide can be made to react with most, if not all, of the lignin present in the part of the raw material treated and the presence of the reaction product in solution in the mass will provide a composition of very high viscosity. The lime or other difficultly soluble alkaline reagent added to this treated material reacts with the solubilized components apparently made up in part of sodium lignate and forms insoluble compounds in a mass in which the unreacted or only slightly reacted additional bark flour serves at least two functions, namely, as a sealer which prevents excessive penetration when the composition is applied on porous surfaces and as a cost reducer in lessening the amount of more expensive components required.

The phenolic materials of the glue compositions of the invention are thermosetting resins of the type suitable for laminating purposes and are referred to in industry as "phenolic resin adhesives." Most commonly, such products constitute alkaline colloidal solutions or aqueous emulsions having from about 42 to 50% resin solids. The resins most generally used in glue compositions and preferred in the present compositions are those resulting from the reaction of alkali catalyzed solutions of phenol and formaldehyde having a pH from about 9.5 to 12. It is also contemplated that phenol-aldehyde resins as are obtained by the reaction of cresol or other substituted phenols with formaldehyde and other aldehydes such as acetaldehyde and paraformaldehyde be used. The resin may be employed in the form of an alcoholic solution or as an aqueous solution, such compositions being known in the art.

A suitable phenolic resin may be produced for example, by reacting 1 mol of phenol with 2 mols of formaldehyde in the presence of sodium hydroxide in an amount of about 3% based on the weight of the phenol, the reaction being carried out at 85 to 100° C. until the proper viscosity is obtained, after which the resulting reaction solution is diluted with a solution of sodium hydroxide to yield a product of about 50% solids, this product being compatible with water and convertible into a hard insoluble product when heated to a temperature above 100° C.

The modified bark materials herein described constitute excellent extender-bodying agents for these phenolic resin adhesives used particularly in plywood manufacture. Tests have shown that these modified organic materials when mixed with resin glue solutions provide plywood adhesive compositions of increased true viscosity usually also having thixotropic properties both of which properties provide superior action on the spreading rolls.

Glue compositions capable of producing high quality laminates are obtained, for example, by reacting 20 parts bark flour with 2 to 5 parts of sodium hydroxide and 2 to 5 parts of calcium oxide in the presence of 20 to 60 parts of water, and mixing with 100 parts ordinary commercial phenolic resin glue emulsion (40–50% solids). In glues for plywood of interior grade, the bark flour may be increased to 40 parts, the two alkaline materials to 15 parts each and the water to 140 parts.

The viscosity and thixotropic properties of the adhesive compositions of the present invention can be altered or controlled to some extent by an adjustment of the amount of soluble components, presumably sodium lignate, in the modified bark flour or in the adhesive composition containing the same. If the modified bark flour contains excess soluble components they can be removed therefrom by dilution with water and decanting. On the other hand if improved viscosity or thixotropic properties are desired in the glue compositions a small percentage of sodium lignates may be added thereto.

In the examples to follow, a low viscosity phenolic resin adhesive and a high viscosity phenolic resin adhesive of the conventional types were employed, the same being identifiable by the properties set forth in the accompanying table:

|  | Resin A | Resin B |
|---|---|---|
| Percent solids | 41.6 | 49.4 |
| Viscosity (G & H) | F | X |
| pH at 25° C | 11.85 | 11.1 |
| Water tolerance, percent at 25° C | Infinite | 800 |

*Example 1*

One hundred parts of phenolic resin A were mixed for 5 to 10 minutes with an extender-bodying agent prepared by adding water to 20 parts of bark phloem flour in a quantity sufficient to thoroughy wet the same upon stirring for 5 to 10 minutes, then adding a 15–30% solution of sodium hydroxide containing calcium oxide dispersed therethrough, there being 3.85 parts of each alkaline material therein, next adding water to total 60 parts and finally stirring the mass for 25 to 30 minutes. A phenolic resin glue composition was obtained suitable for the production of plywood by conventional commercial production methods.

*Example 2*

The process of Example 1 was repeated using an equal amount of phenolic resin B instead of resin A.

To show the advantages flowing from the presence of the new extender-bodying agent in the glue compositions of the present invention over the use in glue compositions of bark phloem flour modified solely by cooking (at 185° F. for 25 minutes) with sodium hydroxide, the process of Example 2 was altered by using an extender prepared without the addition of calcium oxide, this process being later referred to herein as run A.

The glue compositions described herein are suitable for the production of plywood in accordance with conventional commercial procedures using normal press temperatures of 280 to 310° F. and pressures of 200 to 250 pounds per sq. inch. The reaction will advance rapidly during 1 to 6 minute pressing cycles.

To test the compositions of the examples and run A, the glues were spread by means of a mechanical roll spreader, at about equal weights, double glue line on one eighth inch veneer for producing 3-ply plywoods. Assembly times were thirty minutes, pressing time 3 minutes at 300° F. under pressure of 200 pounds per square inch, followed by a post cure at about 120° F. for eight hours.

The comparative results of the plywood samples were as follows:

| Example | 1 | 2 | Run A |
|---|---|---|---|
| Resin A | 100 | | |
| Resin B | | 100 | 100 |
| Bark phloem | 20 | 20 | 20 |
| NaOH | 3.85 | 3.85 | 3.85 |
| CaO | 3.85 | 3.85 | None |
| Water in mix | 60 | 60 | 60 |
| Adhesive visc., cp.: | | | |
|   Fresh | 15,400 | 4,000 | 8,000 |
|   30 min. on roll | 37,200 | 13,600 | 23,200 |
|   Aged 18 hrs | 16,600 | 1,600 | 23,600 |
| Shear, p. s. i.: | | | |
|   Dry | 355 | 245 | 322 |
|   Wet-boil | 165 | 145 | 170 |
| Wood failure, percent: | | | |
|   Dry | 97 | 85 | 25 |
|   Wet-boil | 81 | 82 | 55 |
| Adhesive spread, lbs./M sq. ft | 50 | 49 | 53 |
| Temp. increase | 44 | 46 | 46 |

From the tests recorded in the foregoing table, it will be observed that the glue compositions of the examples produced plywood of good quality as evidenced by the wood failure tests, whereas that of run A produced plywood of poor quality. The glue compositions of the examples show superior stability during ageing and lower spreading rates.

The practice of the present invention leads to a number of advantages including the following:

1. The glue solutions have an increased viscosity of desirable magnitude.
2. The glue solutions are generally thixotropic.
3. The glue solutions have viscosity stability on ageing and with some resins also stability on the spreader rolls.
4. The glue solutions have a tolerance for greater percentages of extender without its separation on the rolls.
5. As compared with prior alkali treated bark phloem flours, the extender-bodying agents of the present invention require lesser amounts of alkali metal hydroxide for the desire bodying action is effected by the insoluble thixotropic reaction products rather than by water-soluble products resulting from the reaction of only sodium hydroxide with the bark flour.
6. An exterior grade of plywood can be produced utilizing bark phloem as the raw material for the extender.
7. The plywood bond has a low content of alkali in a form detrimental to long life of the plywood.

It should be understood that the invention is not limited to the specific details herein set out, for it extends to all equivalent materials and procedures which will occur to those skilled in the art upon consideration of the terms and scope of the claims appended hereto.

We claim:

1. A glue composition comprising an alkaline phenolic-aldehyde resin adhesive solution containing as an extender-bodying agent a bark phloem flour the lignin content of which has at least in substantial part been modified by reaction with an alkali metal hydroxide and with a difficultly soluble (in water) alkaline hydroxide, the latter being employed in an amount which insolubilizes at least a substantial part of the bark phloem solubilized by the alkali metal hydroxide.

2. A glue composition comprising an alkaline phenolic-aldehyde resin adhesive solution containing as an extender-bodying agent a substantially water-insoluble reaction mixture obtained by reacting a bark phloem flour with an alkali metal hydroxide and with a difficultly soluble (in water) alkaline hydroxide, thereby modifying the lignin content at least in substantial part to provide the lignin content ultimately in an insoluble state.

3. A glue composition comprising an alkaline phenolic-aldehyde resin adhesive solution containing as an extender-bodying agent a bark phloem flour modified by reaction of at least a substantial part of the lignin content with an alkali metal hydroxide and with a difficultly soluble (in water) alkaline hydroxide, the hydroxides being used in substantially equivalent amounts.

4. A glue composition comprising an alkaline phenol-formaldehyde resin aqueous emulsion containing as an extender-bodying agent a bark phloem flour the lignin content of which has at least in substantial part been modified by reaction with an alkali metal hydroxide and with a difficultly soluble (in water) alkaline hydroxide, the modified part of the lignin being mostly in the insoluble state in combined amounts of at least 4% in relation to the quantity of flour treated.

5. A thixotropic glue composition for bonding laminates comprising an alkaline phenolic-aldehyde resin adhesive solution containing as an extender-bodying agent a finely divided vegetable material comprising principally the non-fibrous component of bark phloem the lignin content of which has at least in substantial part been modified by reaction with sodium hydroxide and with a difficultly soluble (in water) alkaline hydroxide, the latter being used in a proportion which substantially insolubilizes the lignin content solubilized by the action of the sodium hydroxide.

6. A thixotropic glue composition for bonding laminates comprising an alkaline phenolic-aldehyde resin adhesive solution containing as an extender-bodying agent a finely divided vegetable material substantially free of water-soluble components comprising principally the non-fibrous component of bark phloem the lignin content of which has at least in substantial part been modified by reaction with sodium hydroxide and with calcium hydroxide, the latter being used in a proportion which substantially insolubilizes the lignin content solubilized by the action of the sodium hydroxide.

7. A thixotropic glue composition for bonding laminates comprising an alkaline phenolic-aldehyde resin adhesive solution containing as an extender-bodying agent a substantially water-insoluble reaction mixture obtained by treating a bark phloem flour with sodium hydroxide and with calcium hydroxide and reacting lignin in said phloem with said hydroxides.

References Cited in the file of this patent

UNITED STATES PATENTS

| | | |
|---|---|---|
| 1,941,059 | Steele et al. | Dec. 26, 1933 |
| 2,507,465 | Ayers | May 9, 1950 |
| 2,574,785 | Heritage | Nov. 13, 1951 |